United States Patent

[11] 3,595,544

| [72] | Inventors | George T. Curtis;<br>Marshal Hunt, Jr., both of Ross Township, Allegheny County, Pa. |
|---|---|---|
| [21] | Appl. No | 841,919 |
| [22] | Filed | July 15, 1969 |
| [45] | Patented | July 27, 1971 |
| [73] | Assignee | United States Steel Corporation |

[54] CONTROL SYSTEM FOR CEMENT KILN
7 Claims, 4 Drawing Figs.

[52] U.S. Cl. .................................................... 263/32, 236/15
[51] Int. Cl. ...................................................... F27b 7/00
[50] Field of Search ......................................... 263/33, 32; 236/15 E

[56] References Cited
UNITED STATES PATENTS
| 2,111,783 | 3/1938 | Hults | 263/32 X |
| 3,437,325 | 4/1969 | Putnam et al. | 263/32 |
| 3,469,828 | 9/1969 | Lane | 263/32 |
| 3,483,363 | 12/1969 | Ross | 263/32 X |

Primary Examiner—John J. Camby
Attorney—Robert J. Leek, Jr.

ABSTRACT: This invention relates to the combination of a rotary kiln for sintering raw material into sinter and having drive means connected to the rotary kiln for rotating the rotary kiln, heating means disposed adjacent one end of the rotary kiln for directing a heated fluid through the rotary kiln to sinter the raw material as the raw material passes through the rotary kiln from the other end of the rotary kiln to the one end of the rotary kiln, and control means associated with the rotary kiln for controlling the operation of one of the drive means and the heating means.

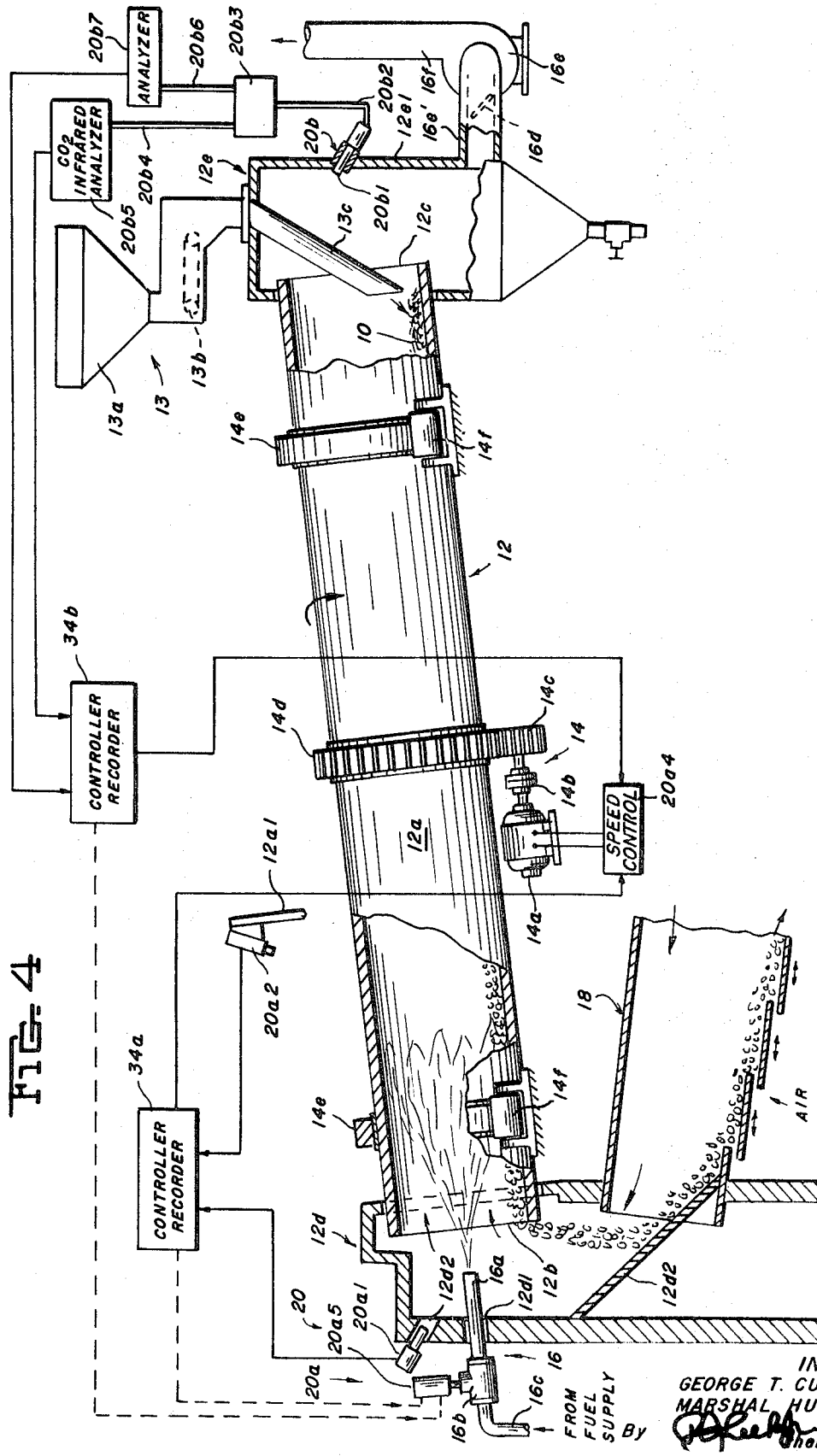

CONTROL SYSTEM FOR CEMENT KILN

BACKGROUND OF THE INVENTION

Heretofore, two control variables, among others, have been used in the manual control of a rotary kiln for the manufacture of cementitious products, such as portland cement clinker, calcium aluminate cement clinker, lightweight aggregates, indurated products or the like, namely, True $CO_2$ content and Burning Zone Temperature. The True $CO_2$ content of cement kiln gases (which comprise in addition to $CO_2$, $O_2$, CO, $N_2$, water vapor and $SO_2$) is defined by the following formula:

$$\text{True } CO_2 \text{ content} = \frac{100(CO_2+CO)}{100+1.89\ CO-4.78\ O_2}$$

This formula is disclosed in the Portland Cement Association Bulletin MRB-SR entitled "Kiln Test Manual." Apparatus for automatically determining and recording the True $CO_2$ content of cement kiln exit gases is disclosed in U.S. Pat. 3,218,842 issued Nov. 23, 1965 to N. C. Ludwig et al. and assigned to the same assignee as the present invention. The recorded information is utilized to manually adjust the kiln speed or fuel input per unit of time to produce normal desired operation of the rotary kiln.

The Burning Zone Temperature is the temperature of the raw material being calcined in the reaction zone of the rotary kiln and is measured by a radiation-type device sighted at the calcined raw material through a peep hole in the kiln hood adjacent the discharge end of the rotary kiln. This Burning Zone Temperature is conventionally displayed on a chart or indicator and utilized to perform manual adjustments in the kiln speed or in the fuel input per unit of time to achieve the desired normal operation.

Conventional control systems for cement kilns are shown in the following:

| U.S. Pat. No. | Issued | Inventor |
| --- | --- | --- |
| 1,967,428 | 7/1934 | Querean |
| 2,298,257 | 10/1942 | Reaser et al. |
| 2,685,205 | 8/1954 | Barnard |
| 2,924,713 | 2/1960 | Liston |
| 3,122,014 | 2/1964 | Dobbins |
| 3,153,587 | 10/1964 | Schuerger |
| 3,300,196 | 1/1967 | Bendy |

OBJECTS OF THE INVENTION

It is the general object of this invention to avoid and overcome the foregoing and other difficulties of and objections to prior art practices by the provision of a control system for a rotary kiln for the pyro-processing of raw material into sinter, the control system being:

1. operable to automatically measure and record the True $CO_2$ content of the cement kiln exit gases and the Burning Zone Temperature;
2. operable to automatically vary the kiln speed in RPM's or the fuel input per unit of time to achieve and maintain predetermined operating conditions;
3. simple and rugged in structure;
4. low in capital cost;
5. capable of a long operational life; and
6. maintained at low maintenance cost.

BRIEF SUMMARY OF THE INVENTION

The aforesaid objects of this invention, and other objects which will become apparent as the description proceeds, are achieved by providing the combination of a rotary kiln for sintering raw material into sinter and having drive means connected to the rotary kiln for rotating the rotary kiln, heating means disposed adjacent one end of the rotary kiln for directing a heated fluid through the rotary kiln to sinter the raw material as the raw material passes through the rotary kiln from the other end of the rotary kiln to the one end of the rotary kiln, and a control means associated with the rotary kiln for controlling the operation of one of the drive means and the heating means

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein:

FIG. 4 is a view similar to FIG. 1 of a semiautomatic embodiment of the control means.

Although the principles of this invention are broadly applicable to rotary kilns for the pyro-processing of raw material in general, this invention is particularly adapted for use in conjunction with raw materials for the production of cementitious products, such as portland cement clinker, calcium aluminate cement clinker and the like and hence it has been so illustrated and will be so described.

DETAILED DESCRIPTION

Figure 1:
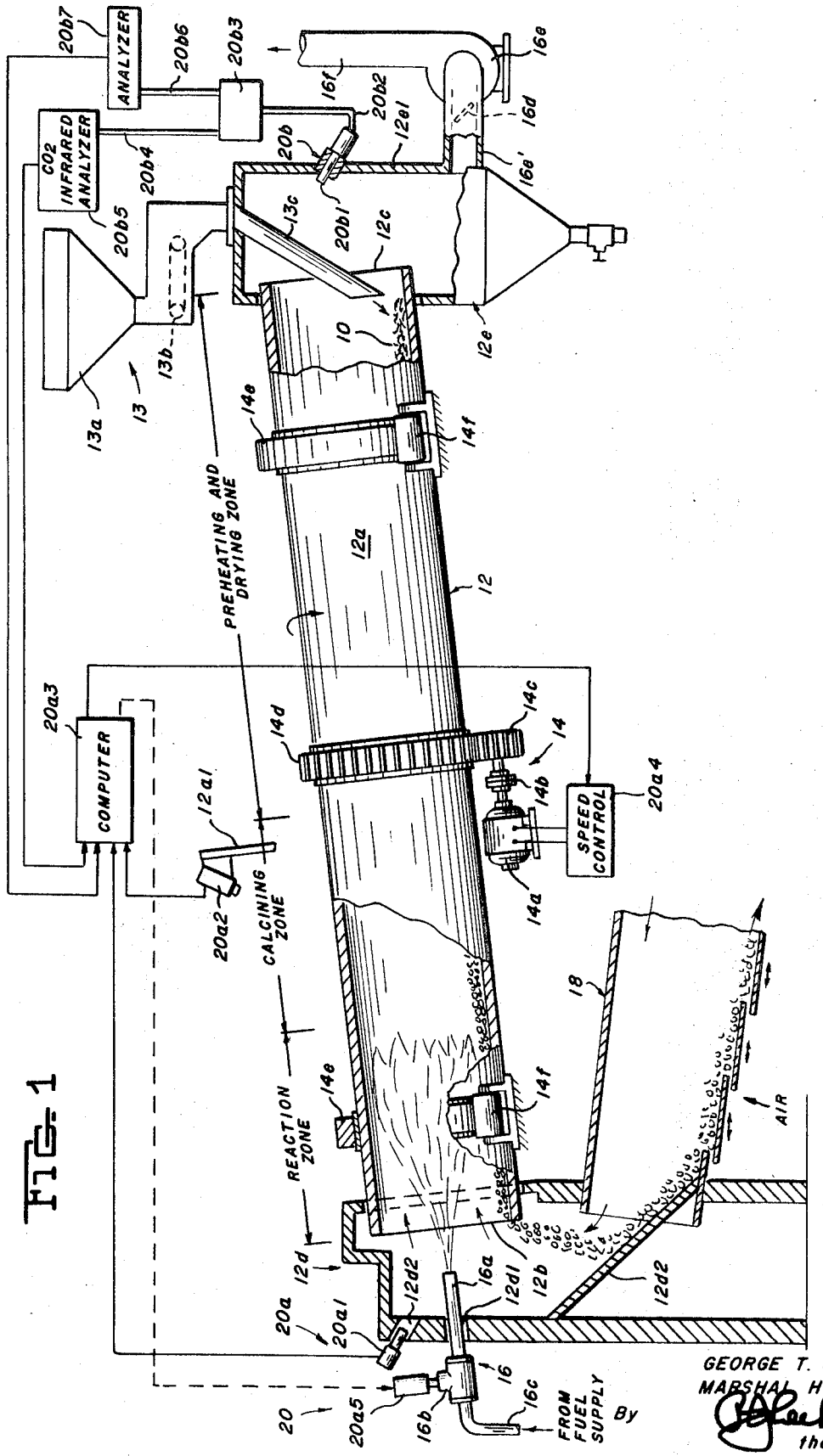
FIG. 1 is a side elevational view partially in section of a rotary kiln for pyro-processing raw material into sinter and showing the kiln drive means, the kiln heating means and the kiln control means.

With specific reference to the form of this invention illustrated in the drawings, and referring particularly to FIG. 1, a rotary kiln for sintering raw material 10 into sinter is indicated generally by the reference numeral 12.

Raw Material 10

The raw material 10 may comprise raw material for the production of portland cement, or calcium aluminate cement, or lime and mixtures having a generally spherical, cylindrical or the like shape and capable of fluid rolling motion.

By way of example, calcium aluminate cement sinter is preferably made from the following raw mixes in which the indicated numbers are percent by weight:

|  | Broad Range | Type A | Type B |
| --- | --- | --- | --- |
| $SiO_2$ | 0—5.0 | 2.5—5.0 | 2.5—5.0 |
| $Al_2O_3/TiO_2$ | 28.0—56.0 | 32.0—37.0 | 35.0—41.0 |
| $Fe_2O_3$ | 0—7.0 | 5.0—7.0 | 0.4—1.4 |
| CaO | 14.0—42.0 | 23.0—28.0 | 21.0—26.0 |
| MgO | 0—3.0 | 0—1.5 | 0—1.5 |
| MnO | 0—1.0 | 0—0.6 | 0—0.6 |
| $SO_3$ as $CaSO_4$ | 0—4.0 | 0.5—2.6 | 0—1.6 |
| Alkalis | Trace | Trace | Trace |
| Loss on Ignition | 26.0—33.0 | 27.0—31.0 | 26.0—33.0 |

Specific raw mixes which may be used for making clinker for Type A and Type B cements are:

|  | Type A | Type B |
| --- | --- | --- |
| $SiO_2$ | 3.3 | 3.3 |
| $Al_2O_3/TiO_2$ | 35.2 | 38.5 |
| $Fe_2O_3$ | 6.2 | 0.8 |
| CaO | 23.9 | 23.5 |
| MgO | 0.1 | 0.8 |
| MnO | 0.3 | 0.3 |
| $SO_3$ as $CaSO_4$ | 1.6 | 1.6 |
| Alkalis | Trace | Trace |
| Loss on Ignition | 29.4 | 31.2 |

For Type B cement it is also possible to use essentially the same mixture with the $SO_3$ omitted.

Portland cement clinkers are preferably made from the following raw mixes:

|  | Portland Raw Mix | | |
|---|---|---|---|
|  | Broad Range | Range | Specific |
| $SiO_2$ | 15.0—19.0 | 16.0—16.8 | 15.4 |
| $Al_2O_3/TiO_2$ | 1.5—6.0 | 3.8—4.4 | 4.3 |
| $Fe_2O_3$ | Trace—4.0 | 1.4—1.8 | 1.5 |
| $CaO$ | 44.0—51.0 | 48.5—50.0 | 49.5 |
| $MgO$ | 1.0—3.0 | 2.0—2.6 | 2.2 |
| $MnO$ | 0.1—0.8 | 0.2—0.4 | 0.2 |
| $SO_3$ as $CaSO_4$ | Trace—1.0 | Trace—1.0 | 1.6 |
| Alkalis | 0.2—0.8 | 0.2—1.0 | 0.5 |
| Loss on Ignition | 22—28 | 23—27 | 24.8 |

In any of the cement mixes mentioned above, the initial heatings are done preferably at a temperature of approximately 1,600° F. In the case of calcium aluminate clinkers, the shock sintering is at a temperature of approximately between about 50 and 150° F., below the melting point of the raw mix. For Type A cement clinkers the preferred temperature is approximately 2,600° F.

In making most portland cement clinkers, the temperature preferably is about 2,700° F. In each case, the feed may be subjected to the sintering temperature for as little as about 20 minutes and preferably under about 1 hour.

The raw material 10 is fed by a feed means 13 (FIG. 1) having a hopper 13a, a weigh feeder 13b (similar to an ABC Series 4,300 Electronic Gravimetric feeder complete with Eriez Model 70A Vibratory Feeder and manufactured by ABC Scale Division, McDowell Wellman Engineering Company, Cleveland, Ohio) and a feed tube 13c to the inlet end 12c of the rotary kiln 12.

Rotary Kiln 12

As shown in FIG. 1 the rotary kiln 12 has a drive means 14 connected to the rotary kiln 12 for rotating the rotary kiln 12.

Such drive means 14 has a DC motor 14a connected at 14b to a gear 14c which gear 14c drives a girth gear 14d affixed to the periphery of the shell 12a of the rotary kiln 12. In order to support the kiln 12, tires 14e, also affixed to the periphery of the shell 12a, roll on rollers 14f.

Heating means 16 are disposed adjacent one end (i.e. the discharge end 12b) of the rotary kiln 12 for directing a heated fluid through the rotary kiln 12 to sinter the raw material 10, as such raw material 10 passes through the rotary kiln 12 from the other end (i.e. inlet end 12c) of the rotary kiln 12 to the discharge end 12b of the rotary kiln 12.

Heating Means 16

In FIG. 1 the heating means 16 has a burner pipe 16a projecting through an opening 12d1 in a hood 12d and is connected through a valve 16b in a line 16c to a source of fuel (not shown) but indicated by the legend "from fuel supply." For use, as hereinafter explained, the valve 16b may be of the diaphragm control valve type (either Type 657 or 667) manufactured by the Fisher Governor Company, Marshalltown, Iowa. The fuel may be natural gas, oil, pulverized coal or the like. For the purpose of supplying air to the burner pipe 16a, such air enters the discharge end 12b (in the direction of the arrows, FIG. 1 from a cooler means 18) of the kiln 12 adjacent a discharge baffle 12d2. The flame from the burner 16a substantially fills the discharge end 12b of the rotary kiln 12 as shown by the bulbous dotted lines in FIG. 1. The air and the heated fluid are introduced adjacent to the burner pipe 16a and pulled through the rotary kiln 12 by an induced draft fan 16e connected through automatically operated damper 16d in conduit 16e' communicating with a backhouse 12e of the rotary kiln 12. The fan 16e exhausts through discharge conduit 16f. The cooler means 18 may be a cooler of the grate type manufactured by Fuller Company, Catasauqua, Pa.

The heated fluid (i.e. the combustion gases from the burner 16a and the evolved gases from the calcining zone of the rotary kiln 12) has a temperature in the range of about 3,000° F.—3,500° F. in the reaction zone (i.e. about 20 percent of the length of the rotary kiln 12 as measured from the discharge end 12b) and produces a reaction temperature in the raw material 10 of about 2,600° F.—2,700° F. In the calcining zone of the rotary kiln 12 (about 20 percent of the kiln length and between the reaction zone and the preheating and drying zone) the heated fluid temperatures of about 2,500° F.—3,000° F. produce load temperatures in the range of about 1,700° F.—2,000° F. Heated fluid temperatures of about 1,400° F.—1,800° F. in the preheating and drying zone produce raw material temperatures up to about 1,000° F.

As part of this invention control means 20 are associated with the rotary kiln 12 for controlling the operation of one of the drive means 14 and the heating means 16.

Control Means 20

One portion of the control means 20 is a temperature responsive means 20a (FIG. 1) having a first temperature measuring means, suitably a load pyrometer 20a1 (projecting into an opening 12d2 in the hood 12d) of the type similar to that shown as General Electric Company Catalogue No. 9851273G13 color ratio pyrometer manufactured by the General Electric Company, West Lynn, Mass. and capable of producing a load temperature signal. A second temperature measuring means, such as a shell pyrometer 20a2 mounted on a bracket 12a1, an upstanding bracket adjacent to and free of the kiln shell 12a, scans the shell 12a and may be either of the Type 8890, 8891, 8892, 8893, or 8898 double mirror type Rayotube temperature detector manufactured by Leeds and Northrup Company, Philadelphia, Pa.

A first control means 20a3, such as a digital computer of the Type GE/PAC 4,000 manufactured by the General Electric Company, Phoenix, Ariz., or an analog computer of the Hitachi type Model 505 manufactured by Hitachi Limited, Tokyo, Japan, is connected to the load pyrometer 20a1 and to the shell pyrometer 20a2 and also through a first control element 20a4 to one of the drive means 14 (as shown by the solid lines in FIG. 1) and through a second control element 20a5 to the heating means 16 (as shown by the dotted lines in FIG. 1) for controlling the operating of the one in response to the temperature signals.

The first control element 20a4 in the case of the drive means 14 may be similar to a silicon controlled rectifier 20a4 Model 6RK11A26 Siliomatic type silicon controlled rectifier equipment rated about 500 volts, and about 640 kw. and manufactured by General Electric Company, Schenectady, N.Y. The rectifier 20a4 is connected to and controls the speed of the DC motor 14a.

The second control element 20a5 for the heating means 16 is a transducer, suitably similar to an electropneumatic transducer Type 543 and manufactured by Fisher Governor Company, Marshalltown, Iowa.

Another portion of the control means 20 includes a True $CO_2$ control device 20b disposed adjacent the inlet end 12c of the rotary kiln 12 in the back wall 12e1 of the backhouse 12e for determining the True $CO_2$ content of the exit fluids or gases of the rotary kiln 12 and for producing a True $CO_2$ signal.

The True $CO_2$ control means 20b has a sampling probe 20b1 mounted in the above-mentioned back wall 12e1 (as viewed in FIG. 1). The sample kiln exit gases from the probe 20b1 are fed by a line 20b2 to apparatus 20b3 for pumping, washing and separating dirt and water from the sample gases, filtering and pressure flowing such exit gases. The apparatus 20b3 is of the type shown in FIG. 1 of U.S. Pat. 3,218,842 issued to N. C. Ludwig et al. on Nov. 23, 1965 and assigned to the same assignee as the present invention. A line 20b4 conducts a portion of the processed sample gases to a $CO_2$ infrared analyzer 20b5, such as Model LIRA manufactured by Mine Safety Appliance Company, Pittsburgh, Pa. and specially calibrated in the range of about 20 to 32 percent $CO_2$. In turn line 20b6 conducts a residual portion of the processed sample gases to an $O_2$ CO analyzer 20b7 suitably a Model OC15 analyzer manufactured by Bailey Meter Company, Cleveland, Ohio. The $CO_2$ signal from the analyzer 20b5 and the $O_2$ and CO signals from the analyzer 20b7 are fed to the input side (i.e. left-hand side as viewed in FIG. 1) of the computer 20a3, the output side of such computer 20a3 being connected as shown in FIG. 1 and as described above to the drive means 14 and the heating means 16 for controlling the operation of one or both of the drive means 14 and heating means 16 in response to the $CO_2$ signal and the $O_2$ and CO signal.

Figure 2:
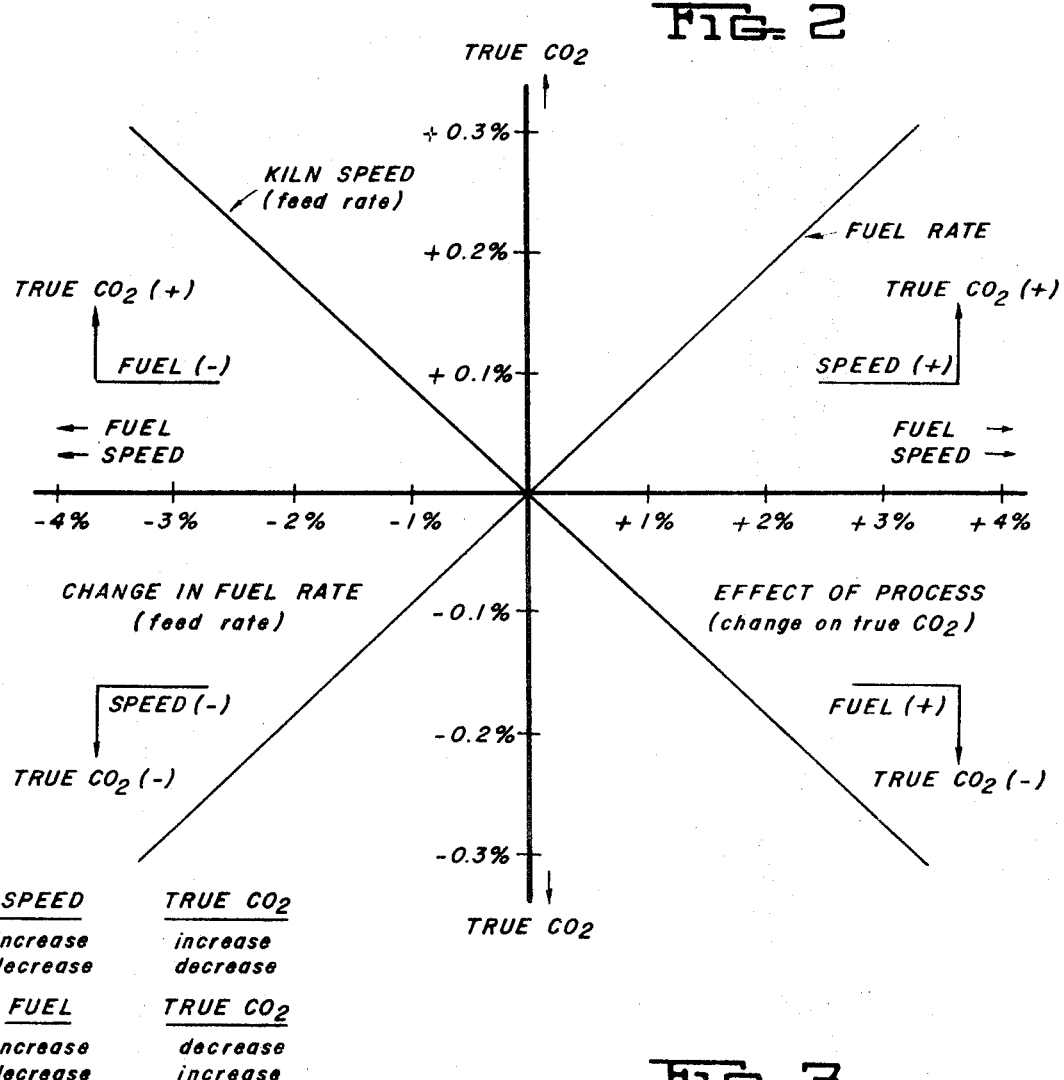
FIG. 2 is a graph showing the automatic compensation in the fuel rate and in the kiln speed (feed rate) when a change occurs from the True $CO_2$ set point.

Referring now to FIG. 2, assume a set point of about 27 percent by volume True $CO_2$ as measured by the $CO_2$ infrared analyzer 20b5 (FIG. 1); a set point of about 2,650° F. for the reaction zone temperature as measured by pyrometer 20a1 (FIG. 1) and; that a negative trend means that the last value was less than the set point and that a positive value means that the last value was more than the set point. The following examples illustrate the automatic compensation in the operation of the kiln 12 when a variation from such set points occur:

Example 1—If the trend (about −0.5 percent per hour) in the True $CO_2$ content is equal to or less than zero and the last value (about 26.8 percent by volume True $CO_2$) is less than the set point (about 27 percent by volume True $CO_2$) and if the trend (about +50° F. per hour) in the reaction zone temperature is equal to or greater than zero and the last value (about 2,660° F.) is above the set point (about 2,650° F.), a gradual overfiring of the kiln 12 is occurring. Accordingly the fuel rate will be automatically reduced about 2 percent (FIG. 2) or the kiln speed (feed rate) increased about 2 percent (FIG. 2). Alternatively the computer 20a3 may be set to cause a proportionate change in both the fuel rate and the kiln speed (feed rate).

Example 2—If the trend (about +0.5 percent per hour) in True $CO_2$ content is positive but less than a critical value (about +2 percent per hour) and the last value (about 27.3 percent by volume True $CO_2$) is above a desired value (about 27 percent by volume True $CO_2$) and if the trend (about −50° F. per hour) in reaction zone temperature is zero or less positive than a critical value (about −200° F. per hour) and the last value (about 2,640° F.) is less than the set point (about 2,650° F.), then a gradual underfiring of the kiln 12 is occurring. Accordingly (FIG. 2) the kiln speed (feed rate) will be decreased about 3 percent or the fuel rate increased about 3 percent. Again, the computer 20a3 may be set to accomplish proportional changes in both the kiln speed (feed rate) and the fuel rate.

Example 3—If the trend (about +2.1 percent per hour) in the True $Co_2$ content is positive and more than a critical value (about +2.0 percent per hour) and last value (about 27.2 percent by volume True $CO_2$) is more than the set point (about 27 percent by volume True $CO_2$) and the trend (about +201° F. per hour) in the reaction zone temperature is positive and more than a critical value (about +200° F. per hour) and the last value (about 2,660° F.) was above the set point (about 2,650° F.) then pronounced underfiring exists in the kiln 12. Accordingly the kiln speed (feed rate) will be automatically reduced about 10 percent (FIG. 2) to cause the trend in the True $CO_2$ content to become negative.

Example 4— If the trend (about −0.5 percent per hour) in the True $CO_2$ content is negative and less than a critical value (about −2.0 percent per hour) and the last value (about 26.7 percent by volume True $CO_2$) is less than the set point (about 27 percent by volume True $CO_2$) and if the trend (about +200° F. per hour) in the reaction zone temperature is positive and more than a critical value (about +200° F. per hour) and the last value (about 2,690° F.) was more than the set point (about 2,650° F.) then pronounced overfiring exists in the kiln 12. As a result the fuel rate (i.e. fuel input percent of time) is automatically reduced (by about 6 percent) to cause the trend (about −0.5 percent per hour) in the True $Co_2$ content to attain the set point (about 27 percent).

Example 5— If the trend (about −1.0 percent per hour) in True $CO_2$ content is negative and less than the critical value (about −2.0 percent per hour) and the last value (about 26 percent True $CO_2$ content) was less than the set point (about 27 percent by volume True $CO_2$ content) and if the trend (about +300° F. per hour) in the reaction zone temperature is positive and more than the critical value (about +200° F.) and the last value (about 2,700° F.) is more than the set point (about 2,650° F.) and the shell pyrometer temperature (about 750° F.) is rising rapidly, then drastic overfiring exists in the kiln 12 and the fuel rate is automatically drastically reduced.

ALTERNATIVE EMBODIMENTS

Figure 3:
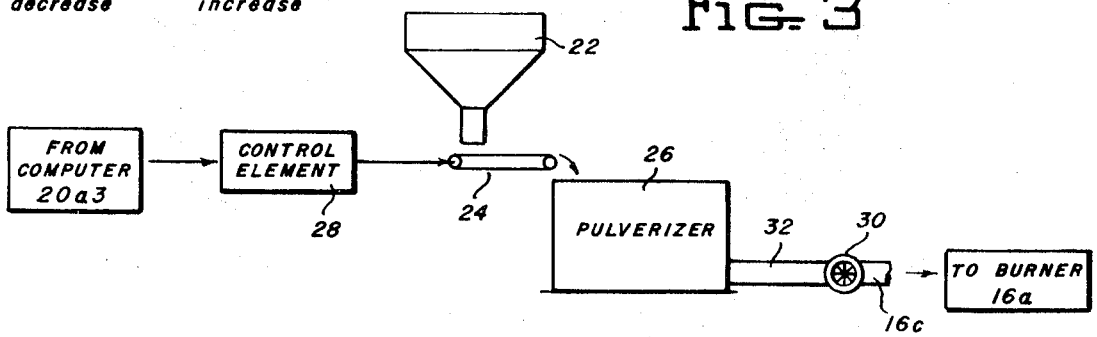
FIG. 3 is a fragmentary diagrammatic view of the control means for a pulverized coal-type of heating means.

It will be understood by those skilled in the art that, alternatively as shown in FIG. 3, coal is fed from a hopper 22 onto a weigh feed 24 similar to an ABC Series 4,300 Electronic Gravimetric Feeder complete with Eriez Model 70A Vibrating Feeder and manufactured by ABC Scale Division, McDowell Wellman Engineering Company, Cleveland, Ohio, which feeder 24 controls the flow of coal to a pulverizer 26 similar to either a Type 713, 733 or 753 Bowl Mill for direct firing rotary kilns and furnaces and manufactured by Combustion Engineering, Inc., Raymond Division, Chicago, Ill. The control element in this case is a controller 28 of the Type 540-30 manufactured by General Electric Company, West Lynn, Mass. A fan 30 conducts the pulverized coal from the pulverizer 26 through conduits 32, 16c to the burner 16a (FIG. 1).

In FIG. 4, the load pyrometers 20a1 and shell pyrometer 20a2 are connected to a controller recorder 34a (similar to the mini-line 500 Type) and having a mini-line 500 strip chart recorder Type KL5110A and a mini-line 500 controller Type AD1 (all manufactured by Bailey Meter Company, Cleveland, Ohio) and to the drive means 14 and heating means 16. The True $CO_2$ analyzer 20b5 and the $O_2$–CO analyzer 20b7 are connected to a controller recorder 34b (similar to the controller recorder 34a, FIG. 4) which controller recorder 34b is in turn connected to the drive means 14 and heating means 16.

SUMMARY OF THE ACHIEVEMENT OF THE OBJECTS OF THE INVENTION

It will be recognized by those skilled in the art that the objects of this invention have been achieved by providing in combination a rotary kiln 12 and control means 20, which control means 20 is operable to automatically measure and record the True $CO_2$ content of the kiln exit gases and the reaction zone temperature, and to automatically vary the kiln speed in RPM's or the fuel input per unit of time to achieve and maintain predetermined operating conditions, is simple and rugged in structure, is low in capital cost, is capable of long operational life and is maintained at low maintenance cost.

While in accordance with the patent statutes the preferred and alternative embodiments of this invention have been illustrated and described in detail, it is to be particularly understood that the invention is not limited thereto or thereby.

I claim:
1. In combination:
 a. a rotary kiln for sintering raw material into sinter and having:
  1. drive means connected to said rotary kiln for rotating said rotary kiln,

2. heating means disposed adjacent one end of said rotary kiln for directing a heated fluid through said rotary kiln to sinter said raw material as said raw material passes through said rotary kiln from the other end of said rotary kiln to said one end of said rotary kiln, and
b. control means associated with said rotary kiln for controlling the operation of one means of said drive means and said heating means,
c. said control means having:
 1. temperature measuring means disposed adjacent said one end of said rotary kiln for measuring the temperature at said one end of said rotary kiln and for producing a temperature signal, and
 2. a first control means to said temperature measuring means and to said one means of said drive means and said heating means and adapted to receive said temperature signal,
d. said control means also having:
 1. a device disposed adjacent said other end of said rotary kiln for determining the True $CO_2$ content of the exit gases of said rotary kiln and for producing a True $CO_2$ signal, and said first control means connected to said device and to said one means of said drive means and said heating means for controlling the operation of said one means in response to said temperature signal and said True $CO_2$ signal.

2. The combination recited in claim 1 wherein said one means is said drive means.

3. The combination recited in claim 1 wherein said one means is said heating means.

4. The combination recited in claim 1 wherein said first control means has computer means connected to said temperature measuring means and a first control element connected to said computer means and said one means.

5. The combination recited in claim 1 wherein said first control means has controller recorder means connected to said temperature measuring means and a first control element connected to said controller recorder means and said one means.

6. The combination recited in claim 1 wherein said first control means has computer means connected to said device and a second control element connected to said computer means and said one means.

7. The combination recited in claim 1 wherein said first control means has controller recorder means connected to said device and a second control element connected to said controller recorder means and to said one means.

UNITED STATES PATENT OFFICE
CERTIFICATE OF CORRECTION

Patent No. 3,595,544     Dated July 27, 1971

Inventor(s) George T. Curtis et al.

It is certified that error appears in the above-identified patent and that said Letters Patent are hereby corrected as shown below:

Column 5, line 13, after "$O_2$" insert -- and --.
Column 6, line 70, "I" should read -- We --.
Column 7, line 14, after "means" insert -- connected --.

Signed and sealed this 2nd day of May 1972.

(SEAL)
Attest:

EDWARD M. FLETCHER, JR.          ROBERT GOTTSCHALK
Attesting Officer                 Commissioner of Patents